July 28, 1964

J. D. BIDLACK 3,142,230

SERVO MOTOR DAMPER

Filed April 4, 1962

INVENTOR.
JERALD D. BIDLACK
BY
Bower & Patalidis
ATTORNEYS

July 28, 1964   J. D. BIDLACK   3,142,230
SERVO MOTOR DAMPER

Filed April 4, 1962                     2 Sheets-Sheet 2

INVENTOR.
JERALD D. BIDLACK
BY
Bower & Patalidis
ATTORNEYS

United States Patent Office 3,142,230
Patented July 28, 1964

3,142,230
SERVO MOTOR DAMPER
Jerald D. Bidlack, Fraser, Mich., assignor to
Cadillac Gage Company, Roseville, Mich.
Filed Apr. 4, 1962, Ser. No. 184,967
19 Claims. (Cl. 91—422)

This invention relates to a servo damper mechanism and more particularly to a variable rate damping bypass for fluid actuated servo motor, providing a damping action which is dependent upon the amplitude and the frequency of the rate of change of the pressure differential between the servo motor chambers.

A typical servo system may consist of a servo actuator for actuating a load, a source of fluid pressure and a servo valve for directing the fluid to the appropriate servo motor chamber for actuating a load by pressure differential upon the faces of a double acting piston operatively connected to the load. One or several input signals control the servo valve, and a feedback device applies to the servo valve a signal representative of the actual position taken by the load under the action of the servo motor.

United States patent application Serial No. 153,076, filed November 17, 1961, in the name of the present inventor and assigned to the same assignee as the present invention, teaches such a servo motor system, and references may be had to the said application for detailed description thereof.

According to the present invention, a leakage bypass is established between the two motor chambers of a double acting piston servo actuator. A valve is disposed in the bypass fluid path to control the amount of leakage fluid flow according to the damping requirements of the system. The amount of leakage is dependent from both the amplitude and the frequency of the motions of the servo actuator.

The principal object of the invention, therefore, is to provide a servo motor damping mechanism providing a damping action dependent upon the amplitude and frequency of the servo motor motions.

Another object of the invention is to provide a servo motor damping mechanism which is self-contained in the servo system and which requires no auxiliary dash-pot.

A further object of the invention is to provide a servo motor damping mechanism which utilizes as a damping medium the same fluid as used for actuating the servo system.

Still another object of the invention is to provide a servo motor damping mechanism which dampens parasitical oscillations in the servo system.

Still a further object of the present invention is to provide a damping mechanism which is suitable for use with a compressible fluid servo system as well as an uncompressible fluid servo system.

Other objects and advantages of the invention will become apparent from a study of the written description taken in consideration with the drawings in which.

Figure 1:
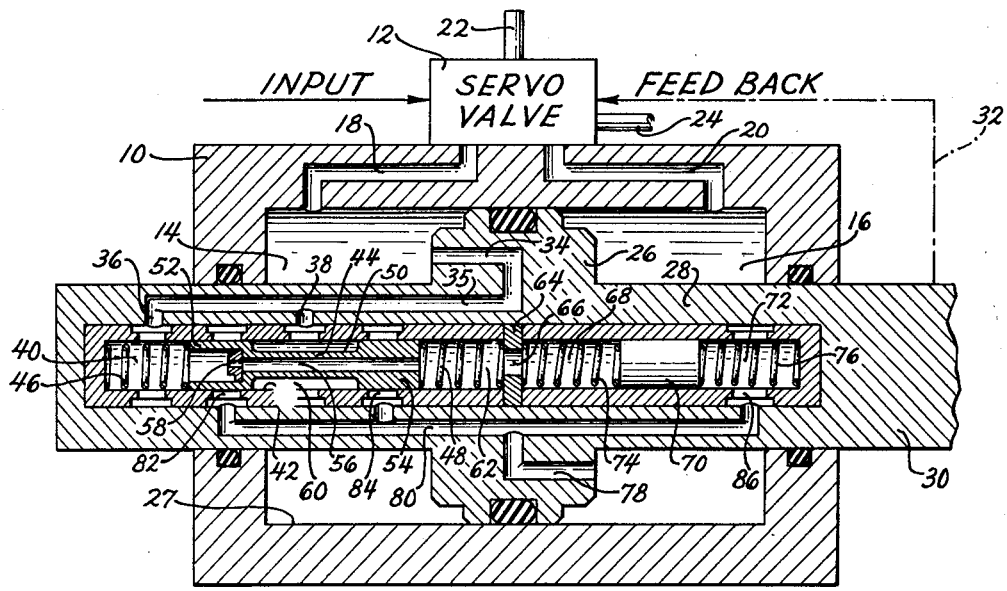
FIGURE 1 is a schematic illustration, partly in section, of an example of a practical application according to the principles of the invention, showing the apparatus at rest.

Referring now to FIGURE 1, a servo actuator 10 is controlled by a servo valve 12 which, via passageway 18 or 20 according to which direction it is desired to move a load, directs fluid under pressure to one of the actuator motor chambers 14 or 16, at the same time that fluid is being drained from the other of the motor chambers. The actuating fluid is supplied from a source (not shown) by means of a conduit 22 leading into the servo valve 12 and is exhausted from the appropriate motor chamber through the servo valve 12 via drain conduit 24.

A double acting piston member 26, slidably disposed within a longitudinal bore 27 in the servo actuator 10, is longitudinally movable in either direction under the action of the pressure differential between the motor chambers 14 and 16, under the control of the servo valve 12. The double acting piston 26 is integral with or fastened to a rod 28 having an output 30 connected to the load. From the output a feedback device, schematically represented by dashed line 32, applies to the servo valve a signal which is algebraically added to the input signal resulting in the appropriate action of the servo valve to actuate the servo actuator in the required direction, and energizing the servo valve to a position which interrupts the motion of the servo actuator as soon as the required position of the load has been obtained.

A bypass passageway 34, provided in the piston member 26, places motor chamber 14 in fluid communication with ports 36 and 38 via channel 35. Port 36 opens into a fluid chamber 40 situated in one end of a sleeved bore 42. Within the bore 42 a valve spool member 44 is slidably disposed between two opposing springs 46 and 48, and the valve spool member has a decreased diameter body portion 50 situated between two land portions 52 and 54. A passageway 56 connecting the two opposite ends of the valve spool member 44 is provided with a restricted orifice 58, for example on its end opening in chamber 40. Port 38, through channel 35, places bypass passageway 34 in communication with annular chamber 60 provided around the decreased body portion of the valve spool member 44.

A fluid chamber 62 is disposed on the other side of valve spool member 44 substantially symmetrically relatively to the fluid chamber 40. A spacer 64 is provided with an orifice 66 which enables chamber 62 to communicate with a chamber 68 situated on one side of a slidable cylindrical spool 70 which, in turn, separates chamber 68 from a substantially symmetrically disposed chamber 72. Coil springs 74 and 76 are disposed respectively in chambers 68 and 72, normally maintaining spool 70 in substantially neutral central position.

From motor chamber 16 a second bypass passageway 78 leads into a channel 80 communicating with ports 82, 84 and 86, ports 82 and 84 normally registering with valve spool member lands 52 and 54, respectively, and port 86 leading into chamber 72.

The servo motor is operated as a result of a fluid pressure differential between chamber 14 and chamber 16. When the pressure in chamber 14 is increased at the same time as the pressure in chamber 16 is decreased, the double acting piston 26 is displaced to the right, as viewed in FIGURE 1. If the increase of pressure in chamber 14 is slow, the motion of the piston is also substantially slow. No damping is necessary, and actually no damping takes place as explained hereinafter.

When fluid pressure in chamber 14 increases slowly, by way of bypass passageway 34 the pressure in chamber 14 is applied to fluid chamber 40, via channel 35 and port 36. The fluid present in chamber 40 flows through restricted orifice 58 and passageway 56 to fluid chamber 62. Fluid chamber 62 being in communication with chamber 68 the fluid pressure is applied to the left face of spool 70, and spool 70 is displaced to the right against the pressure existing in chamber 72 and the restraining force of spring 76. Because the increase of fluid pressure in chamber 40 is substantially slow, there is a very slight pressure drop, if any, across the valve spool member 44 and the valve spool member is displaced, if at all, only of a small amount to the right, of an amount which is not sufficient to unblock port 84. The operation of the device is the same as if no damping mechanism was present in the servo system.

Figure 2:
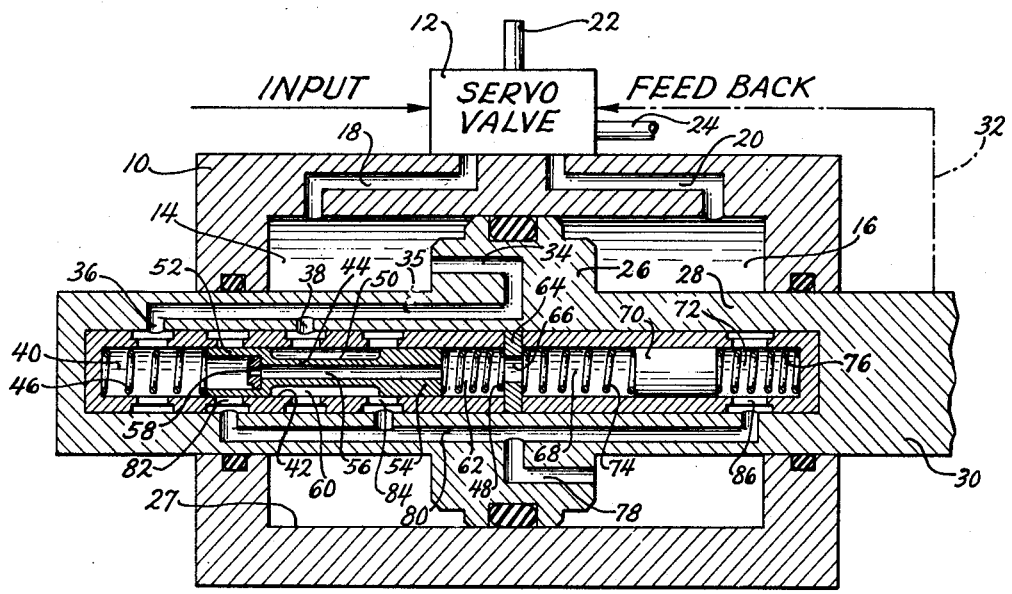
FIGURE 2 is a view similar to FIGURE 1, but showing the apparatus in a dynamic condition when the servo actuator is operated to move the load in one direction.

If the increase of pressure in motor chamber 14 is rapid, the flow of fluid through the restricted orifice 58 is substantial and results in an important pressure drop across the valve spool member 44. The valve spool member is displaced to the right, as shown in FIGURE 2 and port 84 is uncovered by the land 54 of the valve spool member. Annual chamber 60 is now open to passageway 80 via port 84 uncovered by land 54, and fluid is allowed to flow from motor chamber 14 to motor chamber 16 through bypass passageway 34, channel 35, port 38, annular chamber 60, port 84, channel 80 and bypass passageway 78. At the same time as pressure is increased in motor chamber 14, pressure is decreased rapidly in motor chamber 16. This drop of pressure results also in a drop of pressure in chamber 72 and spool 70 is displaced to the right as shown in FIGURE 2, resulting in a pumping action which decreases the pressure in chamber 68 and consequently also in chamber 62, resulting in further displacement of valve spool member 44 to the right, thereby increasing still more the amount of fluid leaking from motor chamber 14 to motor chamber 16.

Figure 3:
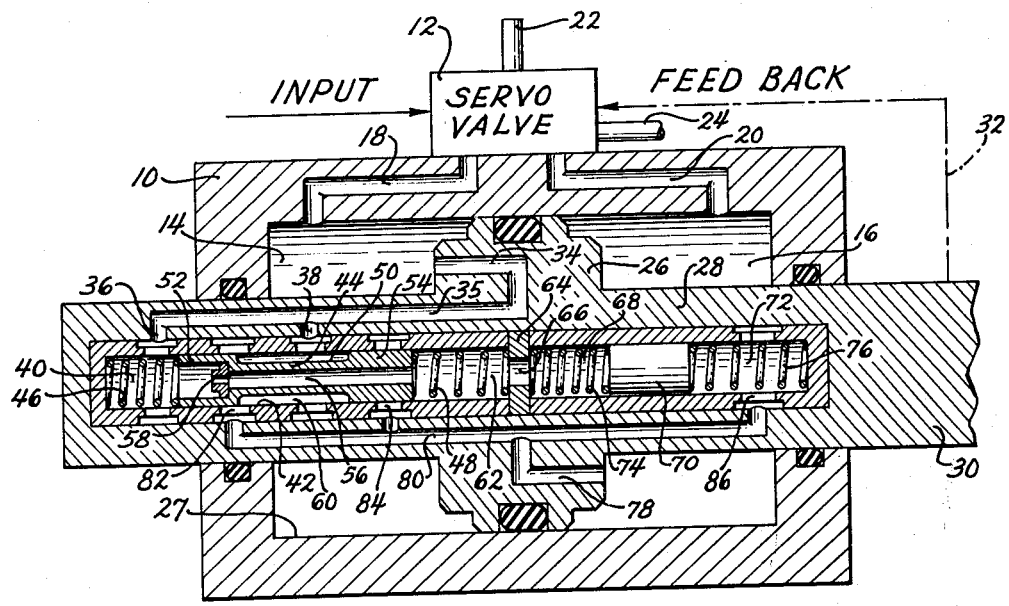
FIGURE 3 is a view similar to FIGURE 1, but showing the apparatus in a dynamic condition when the servo actuator is operated to move the load in an opposite direction.

If the fluid pressure is increased in the motor chamber 16 at the same time as fluid pressure is decreased in motor chamber 14, and the rate of pressure differential is slow, the damping mechanism does not operate as hereinbefore explained. However if the rate of increase of fluid pressure in motor chamber 16 and the rate of decrease of fluid pressure in motor chamber 14 is rapid, the pressure present in motor chamber 16 is applied through bypass passageway 78, channel 80 and port 86 to chamber 72 on the right face of spool 70. Spool 70 is displaced to the left against the tension of coil spring 74 and the fluid present in chamber 68 is displaced into chamber 62 and is forced through passageway 56 in the valve spool member 44. Restricted orifice 58 limits the amount of fluid leaking across valve spool member 44 and this results in a pressure drop across valve spool member 44 which in turn displaces valve spool member 44 to the left, as seen in FIGURE 3. At the same time the decrease of fluid pressure in motor chamber 14 is applied through bypass passageway 34 and channel 35 to port 36 and chamber 40. This action accelerates and increases the displacement of valve spool member 44 to the left in such a way that port 82 is uncovered by land 52 of the valve spool member. Fluid is thus allowed to leak from motor chamber 16 to motor chamber 14 via bypass passageway 78, channel 80, port 82, annular chamber 60, port 38, channel 35 and bypass passageway 34.

By properly choosing the areas of the faces of spool 70 and of valve spool member 44, the spring constants, the overlap of the lands of the valve spool member and of the ports, the size of the restricted orifice, a frequency control bypass is thus established between motor chambers 14 and 16. The amount of damping of the apparatus can thus be designed to meet the desired characteristics of the servo system.

The servo motor damper of the invention has an impedance which is also amplitude dependent. It can be seen that during long strokes of the servo actuator piston, which take a longer period of time to be accomplished than would be the case for short strokes under identical pressure differential between motor chambers 14 and 16, the pressure drop across the valve spool member 44 is rapidly subsiding due to fluid being transferred through passageway 56 in the valve spool member 44, which results in reestablishing a pressure equilibrium between the two ends of the valve spool member 44. The valve spool member is therefore rapidly brought back to the neutral substantially centered position of FIGURE 1, thereby cutting off the fluid leakage path between motor chamber 14 and motor chamber 16. The action of the damper takes place only at the beginning of the stroke and is thereafter eliminated until the piston 26 reaches the end of its stroke, at which time a pressure differential in an opposite direction is again established between motor chambers 14 and 16, due to the ramming action of the piston under its own inertia and the inertia of the moved load as soon as the servo valve 12 interrupts the flow of fluid into one motor chamber at the same time as it interrupts the flow of fluid exhausting from the other motor chamber. This pressure differential, as hereinbefore explained, actuates the valve spool member 44 to place again motor chambers 14 and 16 in fluid communication through the bypass fluid leakage path of the damping mechanism, resulting in a smooth deceleration of the motion imposed upon the load.

It can further be seen that a further advantage of the invention resides in providing a servo system which is also substantially responsive to forces being imposed back from the load to the servo actuator.

If it is assumed, for example, that a force is applied from the load to the output 30 of the rod 28 in a leftward direction as viewed in FIGURE 1, the piston 26 tends to be displaced toward the left and the fluid pressure in motor chamber 14 increases at the same time as the fluid pressure in motor chamber 16 decreases. The unbalance of pressures between motor chambers 14 and 16 causes the valve spool member 44 to be forced to occupy the position illustrated in FIGURE 2, as hereinbefore explained, and a leakage path is established between motor chambers 14 and 16 for a short period of time, resulting in a reduction on the stress imposed upon the servo mechanism.

In the event that the piston 26 has been displaced by the force imposed upon it by the output, the displacement is felt by the feedback device 32 which, in turn, orders the servo valve 12 to correct the error caused by the leakage of fluid from one motor chamber to the other. The servo valve corrects the error by introducing more fluid into motor chamber 14 while draining some fluid from motor chamber 16.

If high frequency vibrations are imposed from the load to the output 30 of the rod 28, the variable rapid fluid pressure differential established between the motor chambers 14 and 16 result in the damper valve spool member 44 to open and close at a frequency identical to the vibrations frequency thereby establishing a leakage path between the motor chambers with the accompanying result of rapid dampening of the vibrations and with the further advantage that vibrations stresses are practically filtered out from the system.

It is also evident that passageway 56 needs not be through the body of the valve spool member 44 and may, alternately, consist of a channel with a calibrated restricted orifice, placing chambers 40 and 62 in fluid communication.

Figure 4:
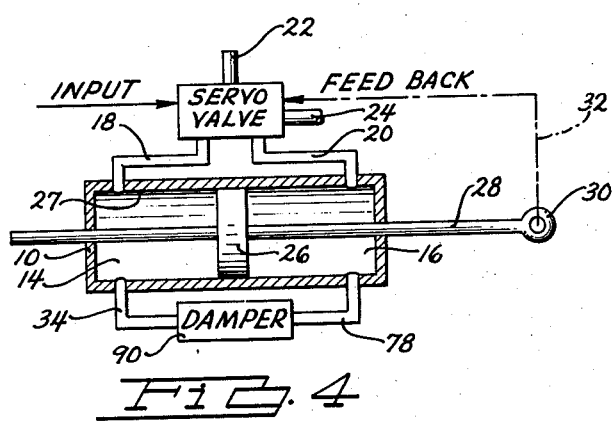
FIGURE 4 is a schematic illustration of a modification of the invention.

In the example of the invention illustrated in FIGURES 1–3 and hitherto described, the damping mechanism has been shown as being incorporated in the double acting piston of the servo actuator. It is evident that the damping mechanism may be situated anywhere in the servo system as long as bypass passageways 34 and 78, or the equivalents thereof, are connected to the motor chambers 14 and 16 on both sides of the servo piston. An example of such an arrangement is schematically illustrated in FIGURE 4 which shows a damper 90 placed between the motor chambers 14 and 16 of a servo actuator 10. The internal construction of the damper is not shown as it is identical to and comprises the elements illustrated in the piston-piston rod portion of FIGURES 1–3, and functions in the same manner as hereinbefore explained.

It is obvious that various other changes, additions and omissions of elements may be made in details within the scope and spirit of the invention, and it is therefore, to be understood that the invention is not to be limited to the specific details, examples and preferred embodiments shown and described.

What is claimed is:

1. In a fluid servo actuator system including a servo actuator responsive to a command signal and adapted to displace a load, said servo actuator comprising a double acting piston reciprocable in a cylinder by a fluid pressure differential between a first and a second motor chambers subjecting the faces of said piston to said fluid pressure differential, a damping mechanism arranged to prevent undesirable oscillations and stresses in said system, said damping mechanism comprising: a fluid flow leakage path between said motor chambers and valving means in said path normally interrupting the flow of fluid through said path, said valving means comprising: a first cylindrical bore with a first port in fluid communication with said first motor chamber, a second port in fluid communication with said second motor chamber, a third port in fluid communication with said first motor chamber and a fourth port in fluid communication with said second motor chamber; a valve spool member slidably disposed in said bore and having a first and a second land portions defining an annular chamber therebetween; means defining in said first cylindrical bore a first fluid chamber on one end of said valve spool member and a second fluid chamber on the other end of said valve spool member; coil springs in both said first and second fluid chambers normally maintaining said valve spool member in a neutral position causing said first land to obturate said second port, said second land to obturate said fourth port, said third port to be open to said annular chamber and said first port to be open to said first fluid chamber; a second cylindrical bore; a spool element slidably disposed in said second bore; means defining in said second bore a third fluid chamber on one end of said spool element and a fourth fluid chamber on the other end of said spool element, said third fluid chamber being at all times in fluid communication with said second fluid chamber and said fourth fluid chamber being at all time in fluid communication with said second motor chamber; coil spring means normally maintaining said spool element in a substantially central position in said second bore; a passageway with a restricted calibrated orifice placing said first and second fluid chambers in fluid communication and causing the variations of fluid pressure in said second fluid chamber to lag in time behind the variations of fluid pressure in said first fluid chamber, whereby a sudden increase of pressure in said first fluid chamber momentarily displaces said valve spool member to a first position away from said neutral position and opens said fourth port to said annular chamber and a sudden decrease of pressure in said first fluid chamber momentarily displaces said valve spool member to a second position away from said neutral position and opens said second port to said annular chamber, and variations of pressure in said fourth fluid chamber cause a displacement of said spool element causing in turn a flow of fluid into and out of said third fluid chamber increasing the difference in pressures between said first and second fluid chambers.

2. The damping mechanism of claim 1 wherein said damping mechanism is included in the double acting piston.

3. The damping mechanism of claim 1 wherein said damping mechanism is exterior to the servo actuator.

4. The damping mechanism of claim 1 wherein the passageway with a restricted calibrated orifice is situated through the body of said valve spool member.

5. The damping mechanism of claim 1 wherein pressure equilibrium between said first and second fluid chambers is reestablished after a period of time determined by the area of said restricted calibrated orifice in the passageway placing said first and second fluid chambers in fluid communication.

6. In a fluid servo actuator system including a servo actuator responsive to a command signal and adapted to displace a load, said servo actuator comprising a double acting piston reciprocable in a cylinder by a fluid pressure differential between a first and a second motor chambers subjecting the faces of said piston to said fluid pressure differential, a damping mechanism comprising: a fluid flow leakage path between said motor chambers and valving means in said path normally interrupting the flow of fluid through said path, said valving means comprising: a first cylindrical bore with a valve spool member slidably disposed therein; coil spring means on both ends of said valve spool member normally maintaining said valve spool member in a neutral position interrupting the flow of fluid through said leakage path and defining in said first cylindrical bore a first fluid chamber on one end of said valve spool member and a second fluid chamber on the other end of said valve spool member, said first fluid chamber being at all time in fluid communication with said first motor chamber; a second cylindrical bore; a spool element slidably disposed in said second bore; coil spring means on both ends of said spool element normally maintaining said spool element in a substantially centered position and means defining in said second bore a third fluid chamber on one end of said spool element and a fourth fluid chamber on the other end of said spool element, said third fluid chamber being at all time in fluid communication with said second fluid chamber and said fourth fluid chamber being at all time in fluid communication with said second motor chamber; a passageway with a restricted calibrated orifice placing said first and second fluid chambers in fluid communication and causing the variations of fluid pressure in said second fluid chamber to lag in time behind the variations of fluid pressure in said first fluid chamber, whereby a sudden increase of pressure in said first fluid chamber momentarily displaces said valve spool member to a first position away from said neutral position establishing a flow of fluid through said leakage path and a sudden decrease of pressure in said first fluid chamber momentarily displaces said valve spool member to a second position away from said neutral position also establishing a flow of fluid through said leakage path and variations of pressure in said fourth fluid chamber cause a displacement of said spool element causing in turn a flow of fluid into and out of said third fluid chamber increasing the difference in pressures between said first and second fluid chambers.

7. The damping mechanism of claim 6 wherein said damping mechanism is included in the double acting piston.

8. The damping mechanism of claim 6 wherein said damping mechanism is exterior to the servo actuator.

9. The damping mechanism of claim 6 wherein the passageway with a restricted calibrated orifice is situated through the body of said valve spool member.

10. In a fluid servo actuator system, the combination of: a servo actuator responsive to a command signal and adapted to displace a load, said servo actuator including a double acting piston reciprocable in a cylinder by a fluid pressure differential between the faces of said piston; damping means arranged to prevent undesirable oscillations and stresses in said system, said damping means comprising: a fluid flow leakage path between said faces; valving means in said path normally interrupting the flow of fluid through said path; said valving means being operable above a predetermined threshold of said fluid pressure differential to establish a flow of fluid through said path for a predetermined period of time only.

11. The fluid servo actuator of claim 10 wherein said valving means comprises a valve spool member slidable in a bore and normally positioned to a first neutral position where it interrupts the flow of fluid through said leakage path, said valve spool member being displaceable away from said first neutral position to positions on both sides of said neutral position to establish said flow of fluid through said path.

12. The fluid servo actuator of claim 11 wherein said valve spool member is solicited to its neutral position by coil springs pressing upon both ends of said valve spool member and is displaced away from said position by a difference in fluid pressures applied to said ends; and a restricted fluid passageway connects said ends to reestablish a pressure equilibrium between said ends after a predetermined period of time.

13. A frequency and amplitude dependent damping mechanism for a fluid servo actuator system including a servo actuator responsive to a command signal and adapted to displace a load, said servo actuator comprising a double acting piston reciprocable in a cylinder under the action of a difference of fluid pressure in two motor chambers on both faces of said piston, said damping mechanism comprising: a fluid flow leakage path between said motor chambers; valving means in said path normally in a neutral position interrupting the flow of fluid therethrough; opposed biasing means normally maintaining said valving means in said neutral position; operating means in fluid communication with one of said motor chambers for displacing said valving means against the action of said biasing means away from said neutral position to a first operative position establishing a flow of fluid through said leakage path as a result of an increase of fluid pressure in one of said motor chambers and for displacing said valving means to a second operative position as a result of a decrease of fluid pressure in the same motor chamber; return means in fluid communication with said operating means through a calibrated orifice for returning said valving means to said neutral position under the influence of said biasing means as soon as a fluid pressure equilibrium is established between said operating means and said return means.

14. The damping mechanism of claim 13 wherein auxiliary operating means in fluid communication with the other of said motor chambers is adapted to apply to said return means a fluid pressure following the variation of fluid pressure in said other motor chamber.

15. The damping mechanism of claim 13 wherein said valving means is operable only beyond a predetermined threshold of pressure differential between said motor chambers and only during a predetermined period of time dependent upon the area of said calibrated orifice.

16. A damping mechanism for a fluid servo actuator operated by pressure differential between two motor chambers, said mechanism comprising: a fluid flow leakage path between said motor chambers; a valve spool member in said path normally interrupting the flow of fluid therethrough when said valve spool member is in a neutral position; a first chamber on one end of said valve spool member, said chamber being at all times in fluid communication with one of said motor chambers; a second chamber on the other end of said valve spool member; a calibrated orificed channel interconnecting said first and second chambers; means applying to said second chamber a fluid pressure commensurate to the pressure in the other of said motor chambers; said valve spool member being movable by pressure differential between said first and second chambers in either direction away from said neutral position to permit a flow of fluid through said leakage path until pressure equilibrium is reestablished between said first and second chambers as a result of fluid flowing through said calibrated orificed channel.

17. The damping mechanism of claim 16 wherein said valve spool member is maintained in said neutral position by coil springs situated on both ends thereof.

18. The damping mechanism of claim 17 wherein the coil spring constants, the area of the end faces of the valve spool member and the area of the orifice in the calibrated orificed channel determine the frequency and amplitude response of the damping mechanism.

19. The damping mechanism of claim 17 wherein the means applying to said second chamber a fluid pressure commensurate to the pressure in the other of said motor chambers comprises: a third chamber in fluid communication with said second chamber; a fourth chamber in fluid communication with the other of said motor chamber; and a movable self centering member separating said third chamber from said fourth chamber.

References Cited in the file of this patent

UNITED STATES PATENTS

| | | |
|---|---|---|
| 2,570,647 | Cormier | Oct. 9, 1951 |
| 2,579,028 | Baldwin | Dec. 18, 1951 |
| 2,950,704 | Andrews | Aug. 30, 1960 |
| 3,045,651 | Ljunggren | July 24, 1962 |
| 3,059,622 | Sexauer | Oct. 23, 1962 |